US012798061B2

(12) United States Patent
Wang et al.

(10) Patent No.: US 12,798,061 B2
(45) Date of Patent: Nov. 17, 2026

(54) IMPACT TOOL

(71) Applicant: Nanjing Chervon Industry Co., Ltd., Nanjing (CN)

(72) Inventors: Hailong Wang, Nanjing (CN); Longxiang Liu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 19/084,916

(22) Filed: Mar. 20, 2025

(65) Prior Publication Data

US 2025/0345904 A1 Nov. 13, 2025

(30) Foreign Application Priority Data

May 11, 2024 (CN) ......................... 202410582791.7

(51) Int. Cl.
*B25F 5/00* (2006.01)
*B25B 21/02* (2006.01)
*B25B 23/14* (2006.01)

(52) U.S. Cl.
CPC .......... *B25B 23/1405* (2013.01); *B25B 21/02* (2013.01); *B25F 5/00* (2013.01)

(58) Field of Classification Search
USPC .......................................................... 173/93.5
See application file for complete search history.

(56) References Cited

U.S. PATENT DOCUMENTS

2016/0250738 A1* 9/2016 Leh .................... B25B 23/1475 173/176
2023/0107745 A1* 4/2023 Shima ................ B25B 23/1475 173/176

* cited by examiner

*Primary Examiner* — Chinyere J Rushing-Tucker
(74) *Attorney, Agent, or Firm* — Greenberg Traurig, LLP

(57) ABSTRACT

An impact tool includes an electric motor includes a motor shaft capable of rotating about a first axis; a battery pack powering at least the electric motor; an impact assembly drivable by the electric motor to provide an impact force; an output assembly including an output shaft for outputting power; where the impact assembly includes an elastic element; and a control circuit including at least a controller. The controller is configured to, in the case where an actual rotational speed of the electric motor is lower than a rotational speed threshold, control output torque of the electric motor to be greater than a tension of the elastic element.

20 Claims, 5 Drawing Sheets

IMPACT TOOL

RELATED APPLICATION INFORMATION

This application claims the benefit under 35 U.S.C. § 119(a) of Chinese Patent Application No. 202410582791.7, filed on May 11, 2024, which application is incorporated herein by reference in its entirety.

TECHNICAL FIELD

The present application relates to the technical field of power tools and, in particular, to an impact tool.

BACKGROUND

An impact tool refers to a tool capable of outputting rotational movements at a certain impact frequency. Common impact tools include an impact wrench, an impact screwdriver, and an impact drill. The impact wrench is typically used for screwing bolts, nuts, and the like. The impact screwdriver is typically used for loosening or tightening screws and the like. The impact drill is typically used for drilling holes through impact.

To output the rotational movements at a certain impact frequency, the impact tool generally includes an output assembly for outputting a rotational force and an impact assembly for periodically impacting the output assembly.

Generally, the higher the rotational speed of an electric motor, the greater the output torque; the lower the rotational speed of the electric motor, the smaller the output torque. When the electric motor operates continuously at a low rotational speed, the torque fluctuates greatly, and it is possible that the tension of a spring is greater than the torque of the electric motor and the spring drives the electric motor to rotate reversely, making it difficult for the impact tool to perform impact at a relatively low impact frequency.

This part provides background information related to the present application, and the background information is not necessarily the existing art.

SUMMARY

In some examples, an impact tool includes an electric motor including a motor shaft capable of rotating about a first axis; a battery pack powering at least the electric motor; an impact assembly drivable by the electric motor to provide an impact force; an output assembly including an output shaft for outputting power; where the impact assembly includes an elastic element; and a control circuit including at least a controller. The controller is configured to, in the case where an actual rotational speed of the electric motor is lower than a rotational speed threshold, control output torque of the electric motor to be greater than a tension of the elastic element.

In some examples, the controller includes any one of a proportional-integral (PI) controller, a proportional-integral-derivative (PID) controller, a proportional (P) controller, or a linear active disturbance rejection control (LADRC) controller.

In some examples, the rotational speed threshold is greater than or equal to a rotational speed of the electric motor corresponding to a lowest impact frequency of the impact assembly.

In some examples, the controller is configured to, in the case where the actual rotational speed of the electric motor is lower than the rotational speed threshold and a duty cycle of a control signal at a current time is less than a duty cycle of the control signal at a previous time, set the duty cycle of the control signal at the previous time as the duty cycle at the current time.

In some examples, the controller is configured to, in the case where the actual rotational speed of the electric motor is lower than the rotational speed threshold and a duty cycle of a control signal at a current time is less than a duty cycle of the control signal at a previous time, adjust the duty cycle at the current time and set the duty cycle of the control signal at the previous time as the duty cycle at the current time.

In some examples, output torque of the electric motor at the current time is greater than or equal to output torque of the electric motor at the previous time.

In some examples, the controller is configured to, in the case where the actual rotational speed of the electric motor is lower than the rotational speed threshold, adjust a variation of a duty cycle of a control signal to be greater than or equal to zero.

In some examples, the variation of the duty cycle of the control signal is a difference between a duty cycle of the control signal at a current time and a duty cycle of the control signal at a previous time.

In some examples, the duty cycle of the control signal at the current time is greater than or equal to the duty cycle of the control signal at the previous time.

In some examples, the controller adjusts the variation of the duty cycle of the control signal to be greater than or equal to zero based on proportional adjustment.

In some examples, the variation of the duty cycle of the control signal is proportional to a rotational speed difference of the electric motor.

In some examples, the rotational speed difference of the electric motor is a difference between the rotational speed threshold and an actual rotational speed of the electric motor at a current time or a difference between the actual rotational speed of the electric motor at the current time and the rotational speed threshold.

In some examples, a lowest impact frequency of the impact assembly is less than or equal to 200 BPM.

In some examples, a lowest impact frequency of the impact assembly is less than or equal to 150 BPM.

In some examples, a lowest impact frequency of the impact assembly is less than or equal to 100 BPM.

In some examples, a lowest impact frequency of the impact assembly is less than or equal to 70 BPM.

In some examples, an impact tool includes an electric motor including a motor shaft capable of rotating about a first axis; a battery pack powering at least the electric motor; an impact assembly drivable by the electric motor to provide an impact force; and an output assembly including an output shaft for outputting power. A lowest impact frequency of the impact assembly is less than or equal to 230 BPM.

In some examples, an impact tool includes an electric motor including a motor shaft capable of rotating about a first axis; a battery pack powering at least the electric motor; an impact assembly drivable by the electric motor to provide an impact force; an output assembly including an output shaft for outputting power; and a control circuit including at least a controller. The controller is configured to, in the case where an actual rotational speed of the electric motor is lower than a rotational speed threshold, adjust a duty cycle of a control signal at a current time to be at least not less than a duty cycle of the control signal at a previous time.

In some examples, the controller includes any one of a PI controller, a PID controller, a P controller, or an LADRC controller.

In some examples, in the case where the duty cycle of the control signal at the current time is less than the duty cycle of the control signal at the previous time, the duty cycle of the control signal at the previous time is set as the duty cycle at the current time.

In some examples, a variation of the duty cycle of the control signal is greater than or equal to zero.

The present application has the following benefit: when the actual rotational speed of the electric motor is lower than the rotational speed threshold, the controller controls the output torque of the electric motor to be greater than the tension of the elastic element so that when the electric motor has a relatively low rotational speed, the electric motor is prevented from being driven by a spring to rotate reversely, enabling the impact tool to impact normally at a relatively low impact frequency.

DETAILED DESCRIPTION

Figure 1:
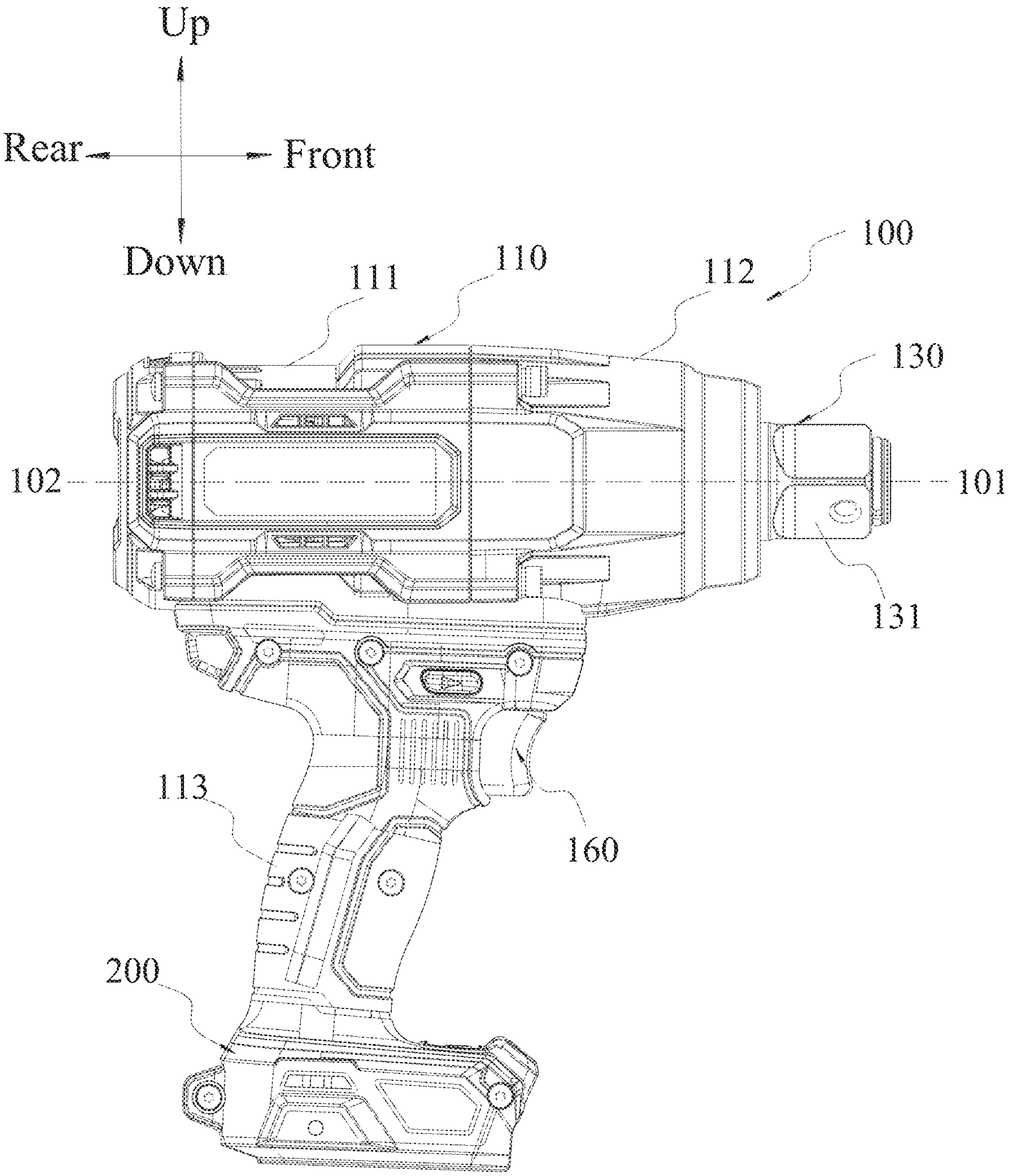
FIG. 1 is a perspective view of an impact wrench according to an example.

Before any examples of this application are explained in detail, it is to be understood that this application is not limited to its application to the structural details and the arrangement of components set forth in the following description or illustrated in the above drawings. In this application, the terms “comprising”, “including”, “having” or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase “comprising a . . . ” does not preclude the presence of additional identical elements in the process, method, article, or device comprising that element.

In this application, the term “and/or” is a kind of association relationship describing the relationship between associated objects, which means that there can be three kinds of relationships. For example, A and/or B can indicate that A exists alone, A and B exist simultaneously, and B exists alone. In addition, the character “/” in this application generally indicates that the contextual associated objects belong to an “and/or” relationship.

In this application, the terms “connection”, “combination”, “coupling” and “installation” may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, “connection” and “coupling” are not limited to physical or mechanical connections or couplings, and may include electrical connections or couplings. In this application, it is to be understood by those skilled in the art that a relative term (such as “about”, “approximately”, and “substantially”) used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, “substantially” when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms “up”, “down”, “left”, “right”, “front”, and “rear” and other directional words are described based on the orientation or positional relationship shown in the drawings, and should not be understood as limitations to the examples of this application. In addition, in this context, it also needs to be understood that when it is mentioned that an element is connected “above” or “under” another element, it can not only be directly connected “above” or “under” the other element, but can also be indirectly connected “above” or “under” the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms “controller”, “processor”, “central processor”, “CPU” and “MCU” are interchangeable. Where a unit “controller”, “processor”, “central processing”, “CPU”, or “MCU” is used to perform a specific function, the specific function may be implemented by a single aforementioned unit or a plurality of the aforementioned unit.

In this application, the term “device”, “module” or “unit” may be implemented in the form of hardware or software to achieve specific functions.

In this application, the terms “computing”, “judging”, “controlling”, “determining”, “recognizing” and the like refer to the operations and processes of a computer system or similar electronic computing device (e.g., controller, processor, etc.).

Figure 2:
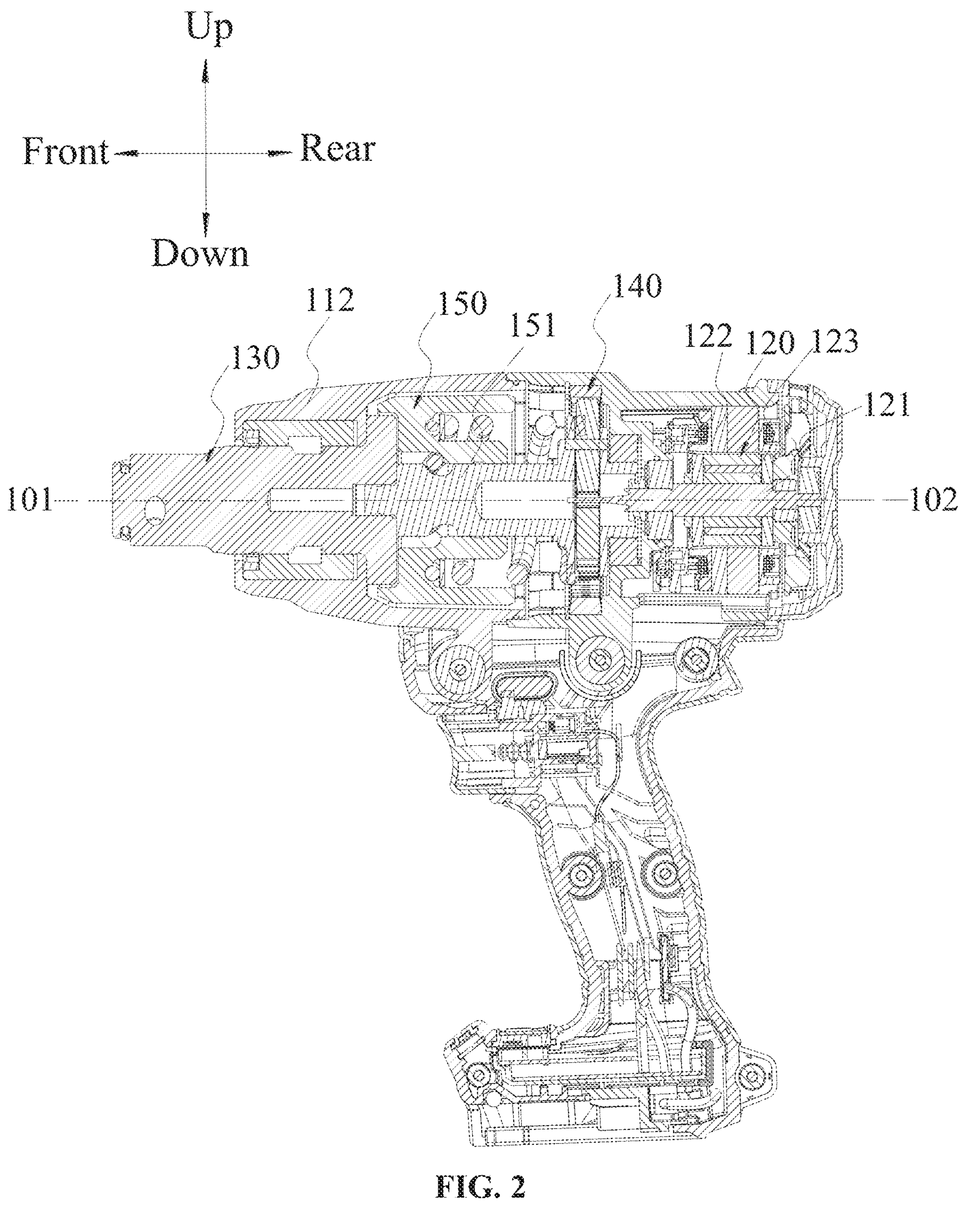
FIG. 2 is a sectional view of the impact wrench of FIG. 1.

FIGS. 1 and 2 show an impact tool in an example of the present application. In this example, the impact tool is an impact wrench 100. It is to be understood that the impact tool is a rotary tool. In other alternative examples, different working accessories may be mounted to the rotary tool so that with these different working accessories, the impact tool may be, for example, an impact screwdriver or an impact drill.

As shown in FIG. 1, the impact wrench 100 in the example of the present application includes a power supply. The power supply is configured to supply electrical energy to the impact wrench 100. In this example, the power supply includes a direct current power supply 200. For example, the direct current power supply 200 is a battery pack. Corresponding components in the impact wrench 100 are powered by the battery pack cooperating with a corresponding power supply circuit. It is to be understood by those skilled in the art that the power supply is not limited to the battery pack, and the corresponding components in the machine may be powered through mains electricity or an alternating current power supply in cooperation with corresponding rectifier, filter, and voltage regulation circuits. In this example, the direct current power supply 200 is specifically configured to be the battery pack. The battery pack 200 is used below instead of the direct current power supply, which is not intended to limit the present application.

As shown in FIGS. 1 and 2, the impact wrench 100 includes a housing 110, an electric motor 120, an output assembly 130, a transmission assembly 140, and an impact assembly 150. The electric motor 120 includes a motor shaft 121 rotating about a first axis 101. The electric motor 120 includes a stator assembly 122 and a rotor assembly 123. The rotor assembly 123 is formed with or connected to the motor shaft 121 rotating about the first axis 101. In this example, the electric motor 120 is a brushless inrunner. In other alternative examples, the electric motor 120 is a brushless outrunner. In the inrunner, the stator assembly 122 is sleeved on the outer side of the rotor assembly 123. In the outrunner, the rotor assembly 123 is sleeved on the outer side of the stator assembly 122. In this example, the brushless motor is configured to be a three-phase brushless motor. It is to be understood that the electric motor is not limited to the three-phase brushless motor and may be another type of direct current electric motor, which does not affect the substance of the present application.

The housing 110 includes a motor housing 111 for accommodating the electric motor 120 and an output housing 112 for accommodating at least part of the output assembly 130. The output housing 112 is connected to the front end of the motor housing 111. The housing 110 is further formed with or connected to a grip 113 for a user to operate. The grip 113 and the motor housing 111 form a T-shaped or L-shaped structure, facilitating the grip and operation of the user. The battery pack 200 is connected to an end of the grip 113. The battery pack 200 is detachably connected to the grip 113.

As shown in FIG. 1, the impact wrench 100 further includes a switch 160. The switch 160 is a trigger switch. The trigger switch is disposed on the grip 113 to be operated by the user to control the impact wrench 100 to be switched on or off.

The output assembly 130 includes an output shaft 131 for connecting a working accessory and driving the working accessory to rotate. A clamping assembly is disposed at the front end of the output shaft 131 and can clamp different working accessories such as a bit, a drill bit, and a socket to implement corresponding functions.

The output shaft 131 is used for outputting power and rotates about an output axis 102. In this example, the first axis 101 coincides with the output axis 102. In other alternative examples, the output axis 102 and the first axis 101 are set at a certain angle. In other alternative examples, the first axis 101 and the output axis 102 are parallel to each other but do not coincide with each other.

Figure 3:
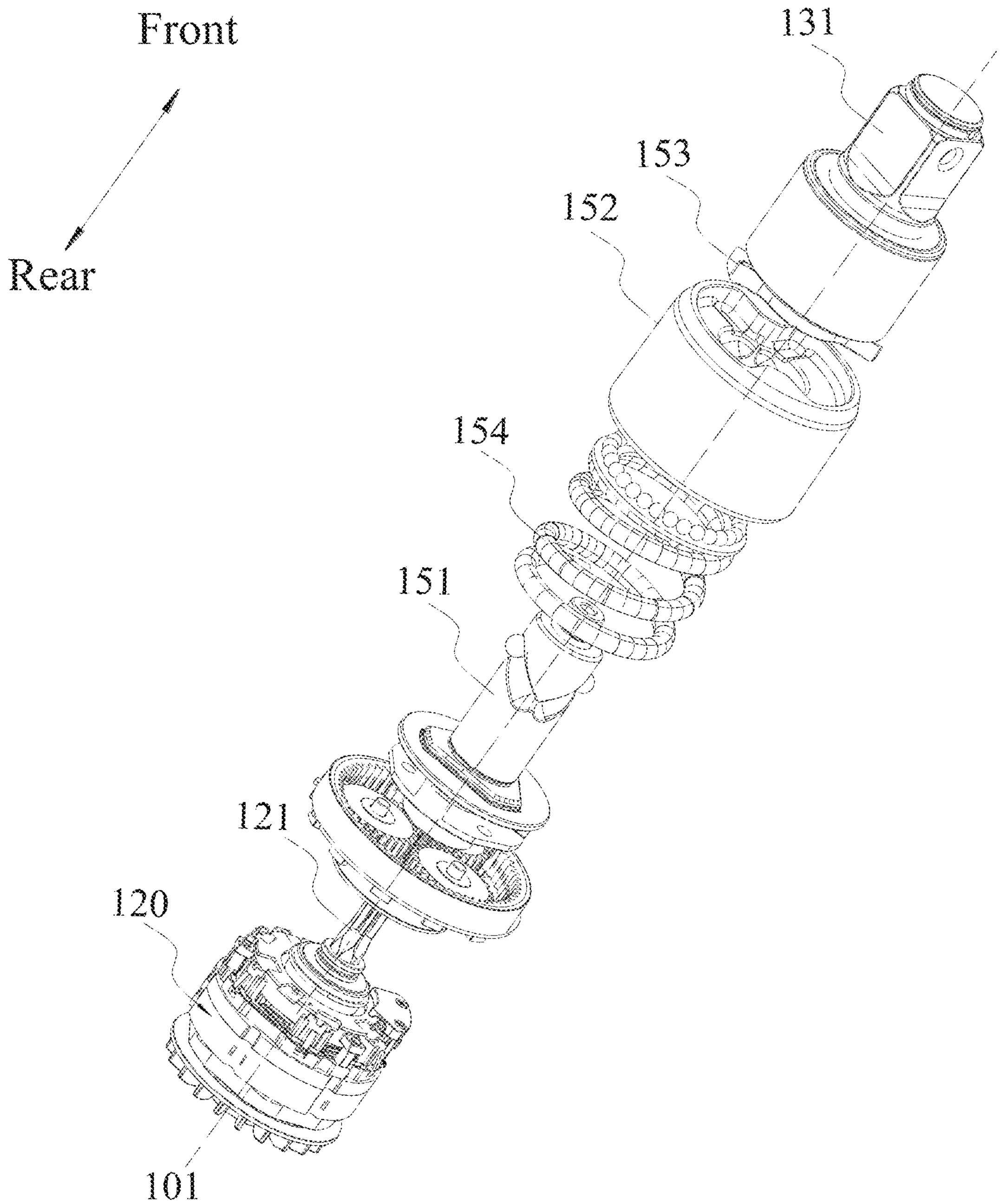
FIG. 3 is an exploded view of an impact assembly of the impact wrench of FIG. 1.

As shown in FIGS. 2 and 3, the impact assembly 150 is used for providing an impact force for the output shaft 131. The impact assembly 150 includes a main shaft 151, an impact block 152 sleeved on the outer circumference of the main shaft 151, a hammer anvil 153 disposed at the front end of the impact block 152, and an elastic element 154. The hammer anvil 153 is connected to the output shaft 131. The output shaft 131 is formed at or connected to the front end of the hammer anvil 153. It is to be understood that the hammer anvil 153 and the output shaft 131 may be integrally formed or separately formed as independent parts.

The impact block 152 is driven to rotate by the motor shaft 121. The hammer anvil 153 mates with the impact block 152 and is impacted by the impact block 152. The main shaft 151 connects the impact block 152 to the motor shaft 121. In some examples, the motor shaft 121 drives the main shaft 151, and the main shaft 151 drives the impact block 152 to rotate.

The output shaft 131 extends out of the output housing 112. The impact block 152 is supported by the main shaft 151 to rotate integrally with the main shaft 151 and can slide back and forth relative to the main shaft 151 in an axial direction of the main shaft 151. In some examples, an axis of the main shaft 151 coincides with the axis of the motor shaft 121. Therefore, the impact block 152 rotates and slides back and forth relative to the main shaft 151 along a direction of the first axis 101. In some examples, the axis of the main shaft 151 may be parallel to the axis of the motor shaft 121 but does not coincide with the axis of the motor shaft 121. Alternatively, the axis of the main shaft 151 and the axis of the motor shaft 121 may be set at a certain angle.

The elastic element 154 provides a force for the impact block 152 to approach the hammer anvil 153. Optionally, the elastic element 154 may be a coil spring. In a working process of the impact wrench 100, the impact block 152 reciprocates a specified stroke relative to the main shaft 151 along the direction of the first axis 101 while rotating integrally with the main shaft 151.

When the impact wrench 100 works with no load, the impact assembly 150 performs no impact and implements a transmission function to transmit the rotation of the electric motor 12 to the output shaft 131. When a load is applied to the impact wrench 100, the rotation of the output shaft 131 is hindered. The output shaft 131 may decrease in the rotational speed or may completely stop rotating due to different magnitudes of the load. When the output shaft 131 completely stops rotating, the hammer anvil 153 also stops rotating and is completely disengaged from the impact block 152. The main shaft 151 drives the impact block 152 to rotate at a certain rotational speed, and the elastic element 154 springs back along the axial direction. A relative rotational speed between the impact block 152 and the hammer anvil 153 is a rotational speed of the impact block 152. When the impact block 152 rotates to be in contact with the hammer anvil 153, the impact block 152 applies an impact force to the hammer anvil 153. Under the action of the impact force, the output shaft 131 overcomes the load and continues rotating by a certain angle, and then the output shaft 131 stops rotating again. The preceding process is repeated. Due to a sufficiently high impact frequency, relatively continual impact forces are applied to the output shaft 131 so that the working accessory works continuously.

The transmission assembly 140 is configured to transmit output torque of the motor shaft 121 to the output shaft 131. In this example, the transmission assembly 140 is disposed between the electric motor 120 and the impact assembly 150 and configured to transmit power between the motor shaft 121 and the main shaft 151. In this example, the transmission assembly 140 performs reduction by using planet gears. The working principle of planetary gear reduction and the reduction performed by the transmission assembly have been fully disclosed to those skilled in the art. Therefore, a detailed description is omitted here for clarity of description.

Figure 4:
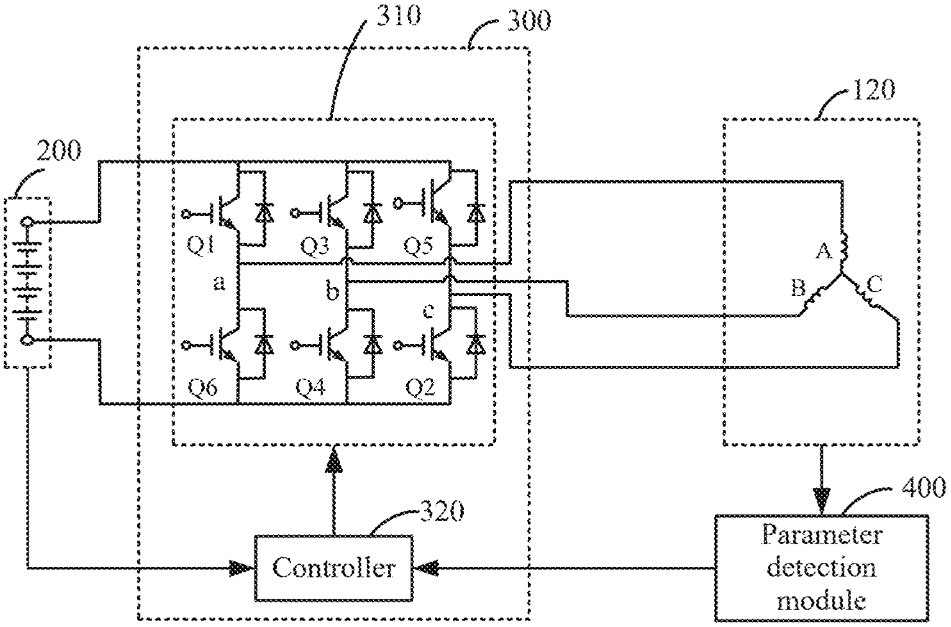
FIG. 4 is a circuit block diagram of the impact wrench of FIG. 1.

Referring to the circuit block diagram of the impact wrench 100 shown in FIG. 4, a drive system of the electric motor 120 may include at least the direct current power supply 200 (that is, the battery pack 200), a control circuit 300, and a parameter detection module 400, where the control circuit 300 may include a driver circuit 310 and a controller 320.

In this example, the electric motor 120 is the brushless inrunner. In other alternative examples, the electric motor 120 is the brushless outrunner. In this example, the brushless motor is configured to be the three-phase brushless motor. It is to be understood that the electric motor is not limited to the three-phase brushless motor and may be another type of direct current electric motor, which does not affect the substance of the present application. The electric motor 120 may include at least three-phase stator windings A, B, and C which may adopt a star connection or a delta connection.

The driver circuit 310 is electrically connected to the stator windings A, B, and C of the electric motor 120 and configured to transmit a current from the battery pack 200 to the stator windings A, B, and C to drive the electric motor 120 to rotate. In an example, the driver circuit 310 includes multiple switching elements Q1, Q2, Q3, Q4, Q5, and Q6 which are disposed on a current path from the battery pack 200 to the electric motor 120. Q1, Q3, and Q5 are high-side switching elements, and Q2, Q4, and Q6 are low-side switching elements. Any phase of stator winding of the electric motor 120 is connected to one high-side switching element and one low-side switching element.

A gate terminal of each switching element in the driver circuit 310 is electrically connected to the controller 320 and configured to receive a control signal from the controller 320, where the control signal may be a pulse-width modulation (PWM) signal. The controller 320 may output the control signal to control the switching element in the driver circuit 310 to be turned on, so as to form a freewheeling state. A drain or source of each switching element is connected to the stator winding A, B, or C of the electric motor 120. The switching elements Q1 to Q6 receive control signals from the controller 320 to change their respective on states, thereby changing the current loaded to the stator windings A, B, and C of the electric motor 120 by the power supply 200. In an example, the driver circuit 310 may be a three-phase bridge driver circuit including six controllable semiconductor power devices (such as field-effect transistors (FETs), bipolar junction transistors (BJTs), or insulated-gate bipolar transistors (IGBTs)). It is to be understood that the preceding switching elements may be any other types of solid-state switches, such as the IGBTs or the BJTs.

As shown in FIG. 4, to drive the electric motor 120 to rotate, the driver circuit 310 has multiple driving states, and in different driving states, the electric motor 120 may have different rotational speeds or different directions of rotation.

In some examples, as shown in FIG. 4, the impact wrench 100 includes the parameter detection module 400 capable of detecting a working parameter of the electric motor 120 during operation, such as a rotational speed of the electric motor 120.

In some examples, the controller 320 may be any one of a PI controller, a PID controller, a P controller, or an LADRC controller, which is not limited in the present application.

Under some working conditions, for example, in the case where a small screw is required to be tightened, to prevent the small screw from surface damage due to an extremely high impact frequency of the impact wrench 100, the impact frequency of the impact wrench 100 is required to remain relatively small. The impact frequency of the impact wrench 100 is directly proportional to the rotational speed of the electric motor 120. Therefore, the electric motor 120 needs to operate continuously at a relatively low rotational speed. However, when the electric motor 120 operates continuously at a relatively low rotational speed, the torque of the electric motor 120 fluctuates relatively greatly. When torque at the latter time is smaller than torque at the former time, the torque of the electric motor 120 fails to overcome a tension of the elastic element 154, and thus the elastic element 154 drives the electric motor 120 in a forward rotation state to rotate reversely. Therefore, when the impact frequency of the impact wrench 100 is relatively low, the problem of possible reverse rotation of the electric motor 120 in the case of a low rotational speed and low torque needs to be solved to enable the impact wrench 100 to work at the relatively low impact frequency.

In some examples, a lowest impact frequency of the impact assembly 150 is less than or equal to 230 BPM. In some examples, the lowest impact frequency of the impact assembly 150 is less than or equal to 200 BPM. In some examples, the lowest impact frequency of the impact assembly 150 is less than or equal to 150 BPM. In some examples, the lowest impact frequency of the impact assembly 150 is less than or equal to 100 BPM. In some examples, the lowest impact frequency of the impact assembly 150 is less than or equal to 70 BPM.

In some examples, when the impact frequency of the impact wrench 100 is required to be relatively low, that is, when the electric motor 120 is required to operate at a relatively low rotational speed, in the case where an actual rotational speed of the electric motor 120 is lower than a rotational speed threshold, the controller 320 is configured to control the output torque of the electric motor 120 to be greater than the tension of the elastic element 154 so that the elastic element 154 does not drive the electric motor 120 to rotate reversely. The actual rotational speed of the electric motor 120 is detected by the parameter detection module 400 and transmitted to the controller 320. The rotational speed threshold of the electric motor 120 is set according to a rotational speed corresponding to a required relatively low impact frequency of the impact assembly 150.

In some examples, that the controller 320 controls the output torque of the electric motor 120 to be greater than the tension of the elastic element 154 includes a first implementation: in the case where the actual rotational speed of the electric motor 120 is lower than the rotational speed threshold and a duty cycle of a control signal at a current time is less than a duty cycle of the control signal at a previous time, the duty cycle of the control signal at the previous time is set as the duty cycle at the current time. Optionally, the rotational speed threshold is greater than or equal to a rotational speed of the electric motor 120 corresponding to the lowest impact frequency of the impact assembly 150. For example, when the lowest impact frequency of the impact assembly 150 is 60 BPM and corresponds to a rotational speed of 210 RPM of the electric motor 120, the rotational speed threshold may be 210 RPM, or the rotational speed threshold may be higher than 210 RPM, for example, the rotational speed threshold is set to 600 RPM.

Figure 5:
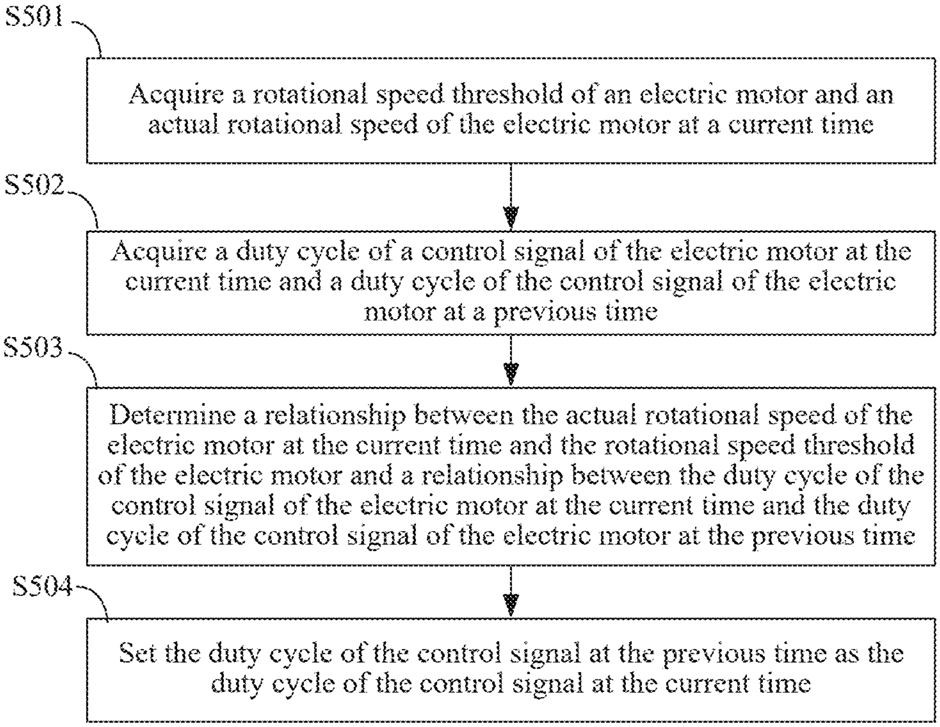
FIG. 5 is a flowchart of an implementation in which a controller controls output torque of an electric motor to be greater than a tension of an elastic element according to an example.

Referring to FIG. 5, the first implementation in which the controller 320 controls the output torque of the electric motor 120 to be greater than the tension of the elastic element 154 includes the steps below.

In S501, the rotational speed threshold of the electric motor and an actual rotational speed of the electric motor at the current time are acquired.

The controller 320 acquires the rotational speed threshold of the electric motor 120 and the actual rotational speed of the electric motor 120 at the current time, where the parameter detection module 400 detects the electric motor 120 to obtain the actual rotational speed at the current time and transmits the actual rotational speed at the current time to the controller 320.

In S502, the duty cycle of the control signal of the electric motor at the current time and the duty cycle of the control signal of the electric motor at the previous time are acquired.

The controller 320 acquires the duty cycle of the control signal of the electric motor 120 at the current time and the duty cycle of the control signal of the electric motor 120 at the previous time. The duty cycle of the control signal at the current time and the duty cycle of the control signal at the previous time are both detected by the parameter detection module 400 and transmitted to the controller 320.

In S503, a relationship between the actual rotational speed of the electric motor at the current time and the rotational speed threshold of the electric motor and a relationship between the duty cycle of the control signal of the electric motor at the current time and the duty cycle of the control signal of the electric motor at the previous time are determined.

After the actual rotational speed of the electric motor 120 at the current time and the rotational speed threshold of the electric motor 120 are acquired in S501, the controller 320 determines the relationship between the actual rotational speed of the electric motor 120 at the current time and the rotational speed threshold of the electric motor 120. After the duty cycle of the control signal of the electric motor 120 at the current time and the duty cycle of the control signal of the electric motor 120 at the previous time are acquired in S502, the controller 320 determines the relationship between the duty cycle of the control signal of the electric motor 120 at the current time and the duty cycle of the control signal of the electric motor 120 at the previous time. When the controller 320 determines that the actual rotational speed of the electric motor 120 at the current time is lower than the rotational speed threshold and the duty cycle of the control signal at the current time is less than the duty cycle of the control signal at the previous time, step S504 is performed. Otherwise, the loop ends. If the actual rotational speed of the electric motor 120 at the current time is lower than the rotational speed threshold, it indicates that the impact wrench 100 can still perform impact at a set relatively low impact frequency. If the duty cycle of the control signal at the current time is less than the duty cycle of the control signal at the previous time, it indicates that the actual rotational speed of the electric motor 120 at the current time is lower than a rotational speed of the electric motor 120 at the previous time and output torque of the electric motor 120 at the current time is less than output torque of the electric motor 120 at the previous time, and it is possible that the elastic element 154 drives the electric motor 120 to rotate reversely.

In S504, the duty cycle of the control signal at the previous time is set as the duty cycle of the control signal at the current time.

After the controller 320 determines in S503 that the actual rotational speed of the electric motor 120 at the current time is lower than the rotational speed threshold and the duty cycle of the control signal at the current time is less than the duty cycle of the control signal at the previous time, the controller 320 sets the duty cycle of the control signal at the previous time as the duty cycle of the control signal at the current time. Thus, the output torque of the electric motor 120 at the current time is not less than the output torque of the electric motor 120 at the previous time, and the electric motor 120 does not encounter the case where the torque at the current time cannot overcome the tension of the elastic element 154, ensuring that the electric motor 120 is prevented from being driven by the elastic element 154 to rotate reversely when the impact wrench 100 performs impact at a low frequency and enabling the impact wrench 100 to perform impact at a relatively low frequency.

Figure 6:
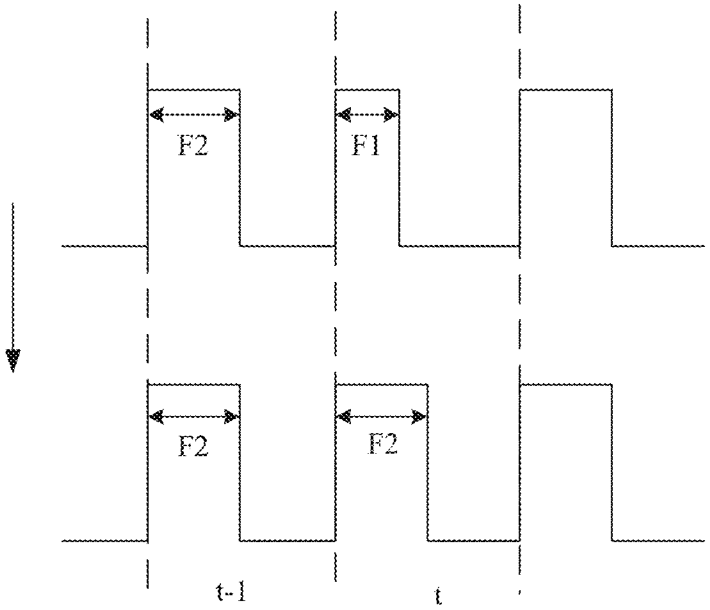
FIG. 6 is a schematic of a change in a duty cycle of an electric motor according to an example.

In some examples, it is set that an impact frequency of 70 BPM of the impact assembly 150 corresponds to a rotational speed D of the electric motor 120, and the rotational speed threshold of the electric motor 120 is D1, where D1 is greater than or equal to D. The parameter detection module 400 detects that the rotational speed of the electric motor 120 at the current time t is E1 and the duty cycle of the control signal of the electric motor 120 at the current time t is F1, and the parameter detection module 400 transmits the rotational speed E1 of the electric motor 120 and the duty cycle F1 of the electric motor 120 to the controller 320. The controller 320 compares the acquired rotational speed E1 of the electric motor 120 with the rotational speed threshold D1 of the electric motor 120 and determines that the actual rotational speed E1 of the electric motor 120 at the current time t is lower than the rotational speed threshold D1 of the electric motor 120. Moreover, the controller 320 compares the acquired duty cycle F1 of the electric motor 120 with a duty cycle F2 of the control signal of the electric motor 120 at a time t−1 and determines that the duty cycle of the electric motor 120 at the current time t is less than the duty cycle of the electric motor 120 at the time t−1. That is, the rotational speed E1 of the electric motor 120 at the current time t is lower than a rotational speed E2 of the electric motor 120 at the time t−1, and the output torque of the electric motor 120 at the current time t is less than the output torque of the electric motor 120 at the time t−1. Therefore, as shown in FIG. 6, the controller 320 controls the duty cycle of the electric motor 120 at the current time t to change from F1 to F2. Thus, the rotational speed E1 of the electric motor 120 at the time t is controlled by the controller 320 to change to be greater than or equal to the rotational speed E2 at the time t−1. Similarly, the output torque of the electric motor 120 at the time t is controlled by the controller 320 to change to be greater than or equal to the torque at the time t−1. Thus, when the impact assembly 150 is at a low impact frequency, the output torque of the electric motor 120 at the latter time is always greater than or equal to the output torque of the electric motor 120 at the former time so that the electric motor 120 does not encounter the case where the torque at the latter time fails to overcome the tension of the elastic element 154. Therefore, when the impact frequency of the impact wrench 100 is relatively low, the electric motor 120 can always keep rotating forward and be prevented from being driven by the elastic element 154 to rotate reversely.

In some examples, that the controller 320 controls the output torque of the electric motor 120 to be greater than the tension of the elastic element 154 includes a second implementation: when the actual rotational speed of the electric motor 120 is lower than the rotational speed threshold, the controller 320 adjusts a variation of the duty cycle of the control signal to be greater than or equal to zero. The variation of the duty cycle of the control signal refers to a difference between the duty cycle of the control signal at the current time and the duty cycle of the control signal at the previous time. That the variation of the duty cycle of the control signal is greater than or equal to zero means that the duty cycle of the control signal at the current time is at least not less than the duty cycle of the control signal at the previous time.

Figure 7:
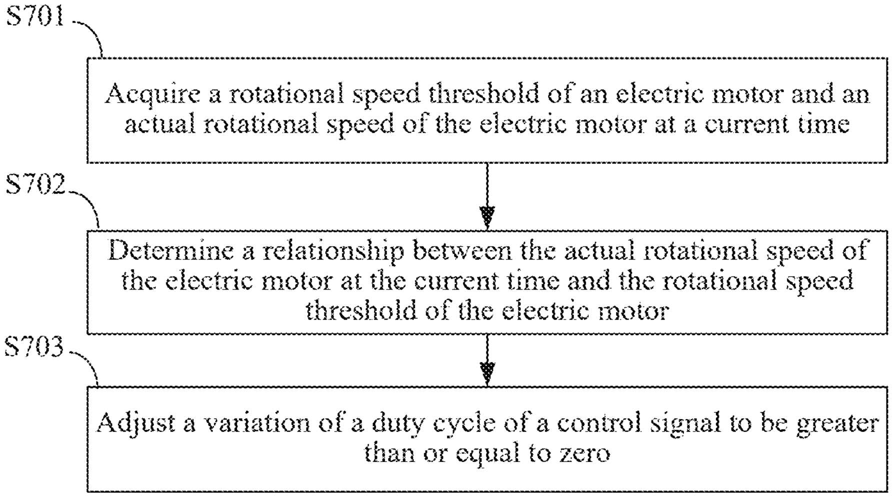
FIG. 7 is a flowchart of another implementation in which a controller controls output torque of an electric motor to be greater than a tension of an elastic element according to an example.

Referring to FIG. 7, the second implementation in which the controller 320 controls the output torque of the electric motor 120 to be greater than the tension of the elastic element 154 includes the steps below.

In S701, the rotational speed threshold of the electric motor and the actual rotational speed of the electric motor at the current time are acquired.

The controller 320 acquires the rotational speed threshold of the electric motor 120 and the actual rotational speed of the electric motor 120 at the current time, where the parameter detection module 400 detects the electric motor 120 to obtain the actual rotational speed at the current time and transmits the actual rotational speed at the current time to the controller 320.

In S702, the relationship between the actual rotational speed of the electric motor at the current time and the rotational speed threshold of the electric motor is determined.

After the actual rotational speed of the electric motor 120 at the current time and the rotational speed threshold of the electric motor 120 are acquired in S701, the controller 320 determines the relationship between the actual rotational speed of the electric motor 120 at the current time and the rotational speed threshold of the electric motor 120. When the controller 320 determines that the actual rotational speed of the electric motor 120 at the current time is lower than the rotational speed threshold, step S703 is performed. Otherwise, the loop ends.

In S703, the variation of the duty cycle of the control signal is adjusted to be greater than or equal to zero.

After the controller 320 determines in S702 that the actual rotational speed of the electric motor 120 at the current time is lower than the rotational speed threshold, the controller 320 controls the duty cycle of the control signal of the electric motor 120 at the current time to be greater than or equal to the duty cycle of the control signal at the previous time so that the variation of the duty cycle of the control signal is always greater than or equal to zero. Thus, the output torque of the electric motor 120 at the current time is greater than or equal to the output torque of the electric motor 120 at the previous time. That is, the torque of the electric motor 120 remains constant or continuously increases in the process of the electric motor 120 compressing the elastic element 154 at a low speed so that the torque does not fluctuate, thereby ensuring that the electric motor 120 is prevented from being driven by the elastic element 154 to rotate reversely when the impact wrench 100 performs impact at a low frequency and enabling the impact wrench 100 to perform impact at a relatively low frequency.

In some examples, the controller 320 may adjust the variation of the duty cycle of the control signal to be greater than or equal to zero by using proportional adjustment. A proportional relationship is set between the variation of the duty cycle of the control signal and a rotational speed difference of the electric motor 120, and the variation of the duty cycle of the control signal is equal to a product of the rotational speed difference of the electric motor 120 and the proportional relationship.

Optionally, the rotational speed difference of the electric motor 120 refers to a difference between the rotational speed threshold of the electric motor 120 and the actual rotational speed of the electric motor 120 at the current time. When the actual rotational speed at the current time is lower than the rotational speed threshold, the rotational speed difference of the electric motor 120 is always greater than zero, and the proportional relationship is a direct proportion so that the variation of the duty cycle of the control signal is always greater than or equal to zero. Optionally, the rotational speed difference of the electric motor 120 refers to a difference between the actual rotational speed of the electric motor 120 at the current time and the rotational speed threshold of the electric motor 120. When the actual rotational speed at the current time is lower than the rotational speed threshold, the rotational speed difference of the electric motor 120 is always greater than zero, and the proportional relationship is an indirect proportion so that the variation of the duty cycle of the control signal is always greater than or equal to zero.

In the present application, when the electric motor 120 has a relatively low rotational speed, the torque of the electric motor 120 does not fluctuate and remains constant or continuously increases in two manners so that the output torque of the electric motor 120 is always greater than the tension of the elastic element 154, enabling the impact wrench 100 to perform impact at the relatively low impact frequency.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. An impact tool, comprising:

an electric motor comprising a motor shaft capable of rotating about a first axis;

a battery pack powering at least the electric motor;

an impact assembly, drivable by the electric motor to provide an impact force, comprising an elastic element;

an output assembly comprising an output shaft for outputting power; and a control circuit comprising a controller, the controller configured to, in a case where an actual rotational speed of the electric motor is lower than a rotational speed threshold, control output torque of the electric motor to be greater than a tension of the elastic element.

2. The impact tool according to claim 1, wherein the controller comprises any one of a proportional-integral (PI) controller, a proportional-integral-derivative (PID) controller, a proportional (P) controller, or a linear active disturbance rejection control (LADRC) controller.

3. The impact tool according to claim 1, wherein the rotational speed threshold is greater than or equal to a rotational speed of the electric motor corresponding to a lowest impact frequency of the impact assembly.

4. The impact tool according to claim 1, wherein the controller is configured to, in a case where the actual rotational speed of the electric motor is lower than the rotational speed threshold and a duty cycle of a control signal at a current time is less than a duty cycle of the control signal at a previous time, adjust the duty cycle at the current time and set the duty cycle of the control signal at the previous time as the duty cycle at the current time.

5. The impact tool according to claim 4, wherein output torque of the electric motor at the current time is greater than or equal to output torque of the electric motor at the previous time.

6. The impact tool according to claim 1, wherein the controller is configured to, in the case where the actual rotational speed of the electric motor is lower than the rotational speed threshold, adjust a variation of a duty cycle of a control signal to be greater than or equal to zero.

7. The impact tool according to claim 6, wherein the variation of the duty cycle of the control signal is a difference between a duty cycle of the control signal at a current time and a duty cycle of the control signal at a previous time.

8. The impact tool according to claim 7, wherein the duty cycle of the control signal at the current time is greater than or equal to the duty cycle of the control signal at the previous time.

9. The impact tool according to claim 6, wherein the controller adjusts the variation of the duty cycle of the control signal to be greater than or equal to zero based on proportional adjustment.

10. The impact tool according to claim 9, wherein the variation of the duty cycle of the control signal is proportional to a rotational speed difference of the electric motor.

11. The impact tool according to claim 10, wherein the rotational speed difference of the electric motor is a difference between the rotational speed threshold and an actual rotational speed of the electric motor at a current time or a difference between the actual rotational speed of the electric motor at the current time and the rotational speed threshold.

12. The impact tool according to claim 1, wherein a lowest impact frequency of the impact assembly is less than or equal to 200 BPM.

13. The impact tool according to claim 1, wherein a lowest impact frequency of the impact assembly is less than or equal to 150 BPM.

14. The impact tool according to claim 1, wherein a lowest impact frequency of the impact assembly is less than or equal to 100 BPM.

15. The impact tool according to claim 1, wherein a lowest impact frequency of the impact assembly is less than or equal to 70 BPM.

16. An impact tool, comprising:

an electric motor comprising a motor shaft capable of rotating about a first axis;

a battery pack powering at least the electric motor;

an impact assembly drivable by the electric motor to provide an impact force; and an output assembly comprising an output shaft for outputting power;

wherein a lowest impact frequency of the impact assembly is less than or equal to 230 BPM.

17. An impact tool, comprising:

an electric motor comprising a motor shaft capable of rotating about a first axis;

a battery pack powering at least the electric motor;

an impact assembly drivable by the electric motor to provide an impact force;

an output assembly comprising an output shaft for outputting power; and a control circuit comprising at least a controller, the controller configured to, in a case where an actual rotational speed of the electric motor is lower than a rotational speed threshold, adjust a duty cycle of a control signal at a current time to be at least not less than a duty cycle of the control signal at a previous time.

18. The impact tool according to claim 17, wherein the controller comprises any one of a proportional-integral (PI) controller, a proportional-integral-derivative (PID) controller, a proportional (P) controller, or a linear active disturbance rejection control (LADRC) controller.

19. The impact tool according to claim 17, wherein, in a case where the duty cycle of the control signal at the current time is less than the duty cycle of the control signal at the previous time, the duty cycle of the control signal at the previous time is set as the duty cycle at the current time.

20. The impact tool according to claim 17, wherein a variation of the duty cycle of the control signal is greater than or equal to zero.

* * * * *